Dec. 6, 1949  W. E. BOYD, JR  2,490,667
DUAL-SPEED PHONOGRAPH TURNTABLE
DRIVE UTILIZING TWO MOTORS
Filed Aug. 23, 1948  2 Sheets-Sheet 1

Inventor
WILTON E. BOYD, JR.
By Francis J. Klempay.
Attorney

Dec. 6, 1949
W. E. BOYD, JR
2,490,667
DUAL-SPEED PHONOGRAPH TURNTABLE
DRIVE UTILIZING TWO MOTORS
Filed Aug. 23, 1948
2 Sheets-Sheet 2
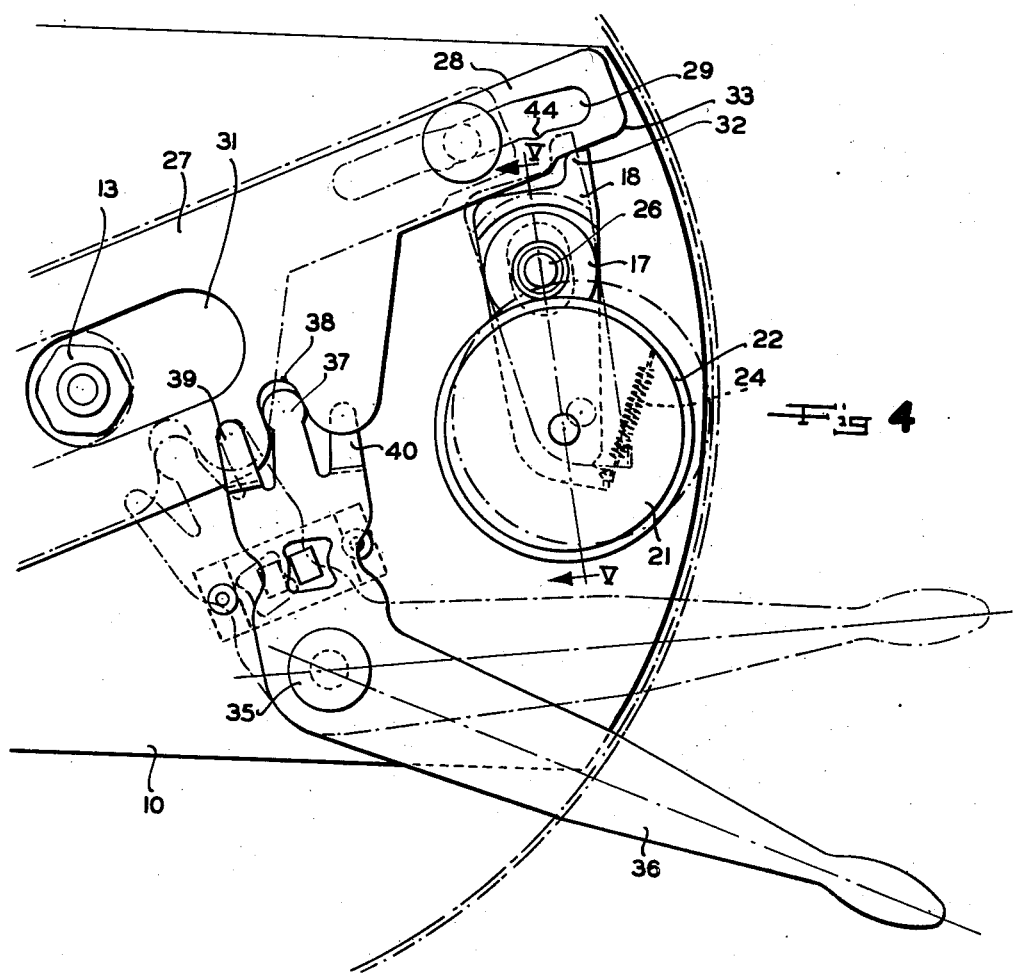
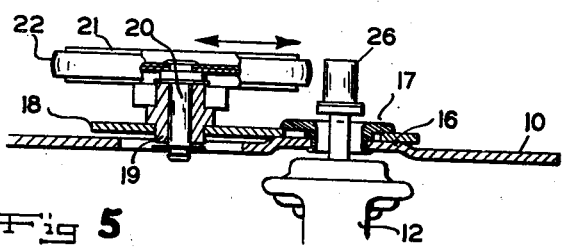
Inventor
WILTON E. BOYD, JR.

Patented Dec. 6, 1949

2,490,667

UNITED STATES PATENT OFFICE 2,490,667

DUAL-SPEED PHONOGRAPH TURNTABLE DRIVE UTILIZING TWO MOTORS

Wilton E. Boyd, Jr., Alliance, Ohio, assignor to The Alliance Manufacturing Company, Alliance, Ohio, a corporation of Ohio Application August 23, 1948, Serial No. 45,720

9 Claims. (Cl. 74—721)

1

This invention relates to driving mechanisms for phonograph turntables and more particularly to apparatus for driving a turntable at either one of two selected speeds. It has heretofore been proposed for this purpose to employ a pair of identical electric motors and to provide a speed-reducing driving interconnection between each of the motors and the turntable for selective conditioning whereby the turntable may be driven at either one of two predetermined speeds. Normally the driving interconnections between the motors and turntables in phonograph assemblies include rubber tired idling or friction wheels arranged to contact metal pulleys on the motor shafts and metal flanges on the turn-tables. Due to the speed reduction required the diameters of the motor pulleys are quite small and if an assembly is allowed to set for any appreciable length of time with the motor pulley in pressure contact with the rubber tire of the idling wheel a permanent set or indentation may result in the periphery of the tire, which makes for uneven subsequent operation. This difficulty also results, but to a lesser extent, if the friction wheels are allowed to stand in pressure contact with the turntable flange. It is accordingly desirable that the motor pulley be moved away from the idling wheel or vice versa when the assembly is not in use and in the case of a dual-speed assembly utilizing two motors and two associated idling wheels it is desirable that the motor pulley of the idle motor be moved away from the associated idling wheel or vice versa even when the companion drive is in operation. It is also desirable that the idling or friction wheels be moved away from the turntable flange when the wheels are not in use.

The primary object of the present invention is the provision of a simple and practical mechanical arrangement in a dual-speed phonograph drive employing a pair of motors and a pair of associated idling wheels for automatically disengaging both the motor pulleys from the idling wheels when neither drive is in use, and for automatically disengaging the pulley of the idle motor from its associated idling wheel when the companion drive is in operation.

A more specific object of the invention is the provision of an improved apparatus for accomplishing the above mode of operation and in accordance with my preferred embodiment of such apparatus the same comprises an improved mounting means for the carriers of the idling wheels whereby a unitary shiftable member may be employed to selectively move both the wheels

2 out of engagement with their motor pulleys and the turntable flange, or one or the other of said wheels out of such engagement while the companion wheel is allowed to have yielding driving interconnection between its companion motor pulley and the turntable flange.

Yet a further object of the invention is the provision in apparatus of the general character outlined above of an improved unitary operating member for such shiftable member and of an improved arrangement for selectively energizing the motors in response to movement of said operating member.

The above and other objects and advantages of the invention will become apparent upon consideration of the following detailed specification and the accompanying drawing wherein there is disclosed a preferred embodiment of the invention.

In the drawing:

Figure 4 is a partial plan view, on an enlarged scale, of the apparatus of Figure 1; and Figure 5 is a fragmentary vertical section taken along the line V—V of Figure 4.

Figure 1:
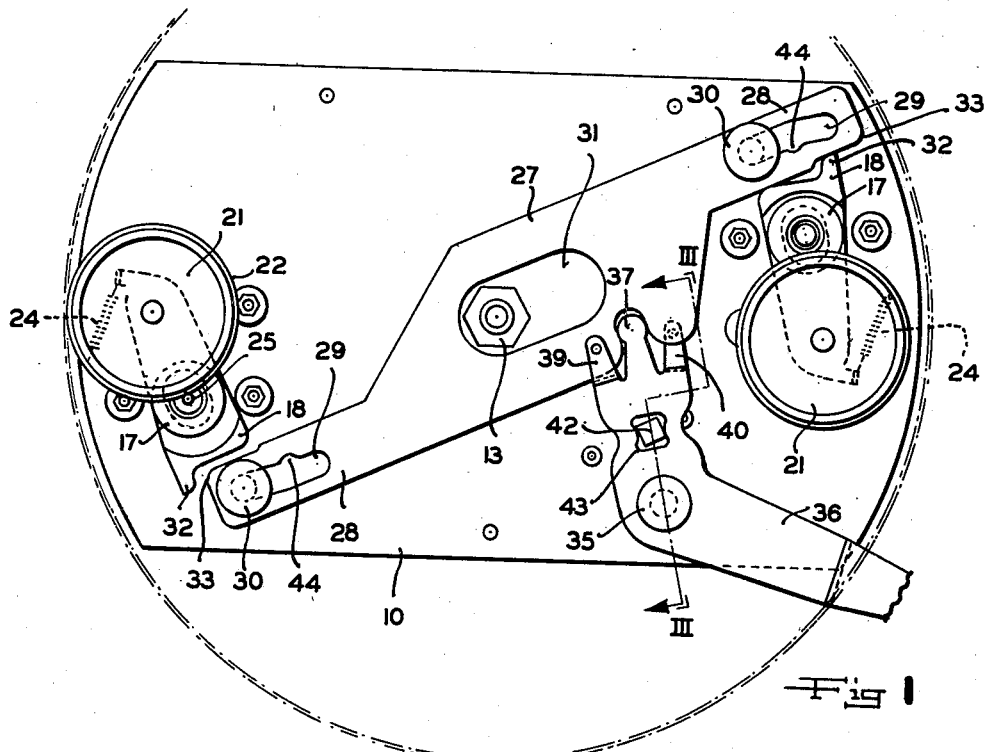
Figure 1 is a plan view of a phonograph turntable drive constructed in accordance with the principles of my invention.

Referring to the drawing in detail, the reference numeral 10 designates a mounting plate which carries, in depending relation therewith, a pair of electric motors 11 and 12. Also supported on the plate 10 is a bearing mount 13 to rotatably support a turntable 14. In accordance with usual practice, the turntable 14 is formed with a depending peripheral flange 15.

The shafts of the motors 11 and 12 extend vertically up through apertures formed in the plate 10 as shown more clearly in Figure 5. Annular portions of the plate 10 immediately surrounding such apertures are raised upwardly from the principal surface of the plate 10 to provide bearing surfaces 16 for the idling wheel carrying members now to be described. Received in such apertures are ferrules 17 each having a wide upper flange spaced upwardly from the bearing surface 16 and interposed between these flanges and the bearing surfaces 16 are the carrier plates 18. Each of the plates 18 is formed with an aperture to receive the shank of the ferrule 17 and this aperture is elongated in the longitudinal direction of the carrier plate to allow the plate to have longitudinal sliding movement relative to the axis of the ferrule 17.

Secured in the outer free end of each of the carrier plates 18 is a bearing 19 which rotatably supports a shaft 20 mounting a wheel 21 on which is affixed a peripheral tire 22 preferably made of rubber. The carrier plates 18 are each formed at their outer free extremity with an integral upwardly directed lug 23 to which is connected one end of a tension coil spring 24, the other end of which is fastened to the mounting plate 10. By referring to Figures 1 and 4, it will be noted that the directions of the springs 24 are such that the carriers 18 are biased to such rotational and longitudinal positions that the friction or idling wheels 21, 22 are maintained in yieldable engagement with both the inner surface of the turntable flange 15 and with the motor pulleys which are carried by the upper ends of the motor shafts which project upwardly through the ferrule 17 as indicated more clearly in Figures 2 and 5. The shaft of motor 11 is provided with a small diametered pulley 25 while the shaft of motor 12 is provided with a large diametered pulley 26. The speed of the turntable 14 is, of course, determined by which of the motors has operative driving interconnection with the turntable. The shifting means for transfering the drive from one motor to the other will now be described.

Slidably mounted on the plate 10 is a flat link 27 having a pair of offset but diametrically opposed end portions 28 each formed with a slot 29 to receive a flanged guide stud 30 which is secured to and projects upwardly from the mounting plate 10. Link 27 is also formed with a centrally disposed elongated aperture 31 to receive the bearing mount 13. While not shown, annular portions of the plate 10 immediately surrounding the shanks of the studs 30 are raised upwardly from the general plane of the plate 10, in the manner suggested by the bearing 16 of Figure 5, to position the link 27 in the same plane with the carriers 18. An outer corner of each of the carriers 18 is formed with an integral rounded tab 32 arranged to be engaged by a rounded corner 33 of the end portions 28 of the link 27 and to slide along a side edge of the portion 28 adjacent to the corner 33. This side edge is formed with an inclined shoulder and beyond the shoulder the side edge is arranged to be engaged by the inner corner of the carrier 18 upon the link section 28 being moved radially outward to engage and move the link 18.

Figure 2:
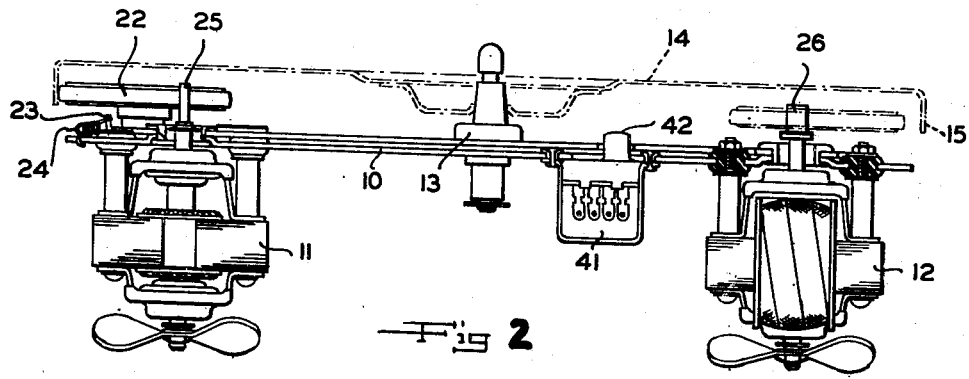
Figure 2 is a side elevation of the apparatus of Figure 1.

The operation of the apparatus described immediately above may be better understood by comparing the left half portion of Figure 1 with Figure 4. Thus, in Figure 1 the carrier 18 is free to rotate and to slide longitudinally on the ferrule 17 and consequently the spring 24 acts to yieldably retain the friction wheel 21, 22 in driving contact with both the turntable flange 15 and the motor pulley 25. Assuming the motor 11 to be energized the turntable will be driven at a speed determined by the ratio of the diameters of the motor pulley 25 and the tire 22. If now the link 27 is shifted to the left the rounded corner 33 of the end portion 28 will engage the mounted tab 32 of the carrier 18 and the carrier will be rotated in a clockwise direction to withdraw the wheel 21, 22 from the flange 15. As the carrier rotates its inner rounded corner will engage the adjacent side edge of the link portion 28 at about the location of the inclined shoulder thereon so that continued radially outward movement of the link portion 28 will cause the carrier 18 to move longitudinally in a direction away from the axis of the motor pulley 25 whereby the tire 22 will be moved free of the motor pulley. Thus, the wheel 21 is moved in a positive manner to the position shown at Figure 4, wherein the tire 22 is free and clear of both the motor pulley and the turntable flange. Upon the link 27 being shifted in the opposite direction to the full line position shown in Figure 1 the retraction of the link portion 28 allows the spring 24 to control the position of the adjacent friction or idling wheel whereby the motor pulley 25 is again operatively coupled with the turntable. At the same time the wheel 21 which is associated with the motor pulley 26 is moved to an operative free position. The means for shifting the link 27 will now be described.

Figure 3:
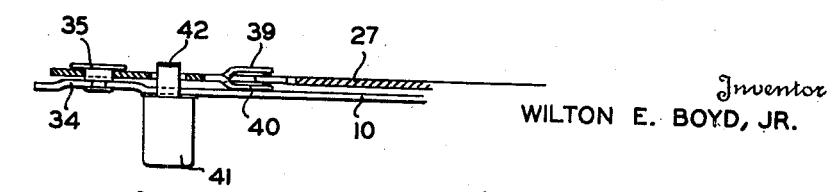
Figure 3 is a vertical section taken along the line III—III of Figure 1.

Extending upwardly from a raised portion 34 of the plate 10 (Figure 3) is a flanged pivot pin 35 which mounts a bell crank lever 36, the outer free end of which projects under and outwardly of the periphery of the turntable while the inner end is trifurcated with the central trifurcation bulged and rounded as shown at 37 for limited rotational and slidable reception in a slot 38 formed in the link 27. The end trifurcations 39 and 40 are bent oppositely out of the plane of the link 27 and lever 36 so that the trifurcation 39 overlies the top surface of the link 27 while the trifurcation 40 underlies the bottom surface of the link 27, all as shown in detail in Figures 3 and 4. This arrangement guides the central trifurcation 37 and insures proper interengagement of the same with the side edges of the slot 38 as will be understood.

Secured to and depending from the plate 10 is a switch 41 preferably of the snap acting type and having a slidable operator 42 which projects upwardly through an aperture 43 formed in the lever 36 intermediate the trifurcated end thereof and the pivot pin 35. Switch 41 is so constructed that the operator 42 has linear movement with three aligned positions, the center of which is an "off" position with neither of the motors 11 and 12 energized. Through suitable wiring, not shown, the switch is so connected that when the operator 42 is moved to its right position as viewed in Figures 1 and 2, the motor 11 is energized while the motor 12 is de-energized. When moved to its extreme left position the motor 11 is de-energized while the motor 12 is energized. Thus, the control lever 36 is operative to de-energize both the motors or to selectively energize either of them while simultaneously and synchronously shifting the link 27 to remove the particular friction wheel not in use from both its associated motor pulley and turntable flange.

It should be observed that with the control lever 36 in its center or neutral position wherein the switch operator 42 is in its center position to de-energize both motors the shift link 27 will likewise be in a neutral or center position. When in such position, however, both the friction wheels will be free and clear of their respective motor pulleys and of the turntable flange due to the fact that the overall length of the link 27 is greater than the spacing between the two lugs 32 of the respective wheel carriers 18. The elongated nature of the link portions 28 and particularly of the side edges thereof which engage the members 18 allows considerable over-travel in either direction from a neutral or central position so that by shifting the lever 36 in one direction from its neutral position one of the friction wheels will be maintained in free and operative position while the other is released for engagement with the turntable flange and its associated motor pulley.

The side edges of the slots 29 in the link 27 closest to the carriers 18 are each formed with a notch 44 which is arranged to partially receive the shank of the adjacent guide stud 30 when the link 27 is moved to center or neutral position. It should be noted that when the link 27 is in such position the projection 32 of both the carriers 18 is bearing against the side edges of the extension 28 inwardly of the rounded corners 32. Since the carriers 18 are yieldingly urged to rotate by the springs 24 a yielding force is maintained on the end portions 28 tending to move the same sideways whereby the notch 44 will be retained about the shank of the stud 30. In this manner the link 27 is releasably latched in center or neutral position.

It should now be apparent that I have provided an improved dual-speed phonograph turntable driving assembly utilizing a pair of driving motors and an associated pair of friction wheels which accomplishes the objects initially set out. Due to the use of a maximum number of duplicate parts in the respective lines of drive while yet maintaining the total number of parts to a minimum substantial economies in production can be effected. Further, by arranging various separate parts to each perform a number of functions the overall mechanism is rendered extremely simple in design and dependable in continued use. Of particular importance is the provision of the practical and simplified control system of the invention whereby through the use of but a single manual control the energization of the motors may be properly controlled while in all cases the friction or idling wheel or wheels for the particular motor or motors which is not in use is automatically held free and clear of driving and driven elements thereby positively avoiding the formation of any deleterious flat spots on the tires of the wheels. The matter of uniform rotational speed is quite important for high fidelity reproduction of phonograph records and is of especial importance in connection with the operation of low-speed record systems.

The above specifically described embodiment of the invention should be considered as illustrative only as obviously many changes may be made therein without departing from the spirit or scope of the invention. Reference should therefore be had to the appended claims in determining the scope of the invention.

I claim:

1. A driving assembly for a flanged turntable comprising in combination a pair of spaced motor-driven shafts rotatable about axes generally parallel with the axis of rotation of the turntable and each having a driving pulley at its upper end, a friction wheel interposed between each pulley and the flange of said turntable, spring-biased movable carriers for said wheels operative to retain each of said wheels in yielding pressure contact with said flange and the adjacent one of said pulleys, and a unitary shifting mechanism for engaging said carriers and operative to move either one of said carriers in opposition to the bias of its spring to withdraw the wheels carried thereby from contact with said flange and its adjacent pulley while the other of said carriers remains spring-biased to maintain the wheel carried thereby in said yielding pressure contact with said flange and its adjacent pulley.

2. Apparatus according to claim 1 further characterized in that said shifting mechanism is of such length as to engage both said carriers when in center or neutral position whereby both said wheels are maintained out of contact with said flange and said pulleys.

3. A driving assembly for a flanged turntable comprising in combination a pair of spaced motor-driven shafts rotatable about axes generally parallel with the axis of rotation of the turntable and each having a driving pulley at its upper end, a mounting plate, a pair of carriers movably mounted on said plate, a friction wheel journaled on each of said carriers and arranged to be brought into yielding engagement with the flange of said turntable and an adjacent one of said pulleys, a spring for each of said carriers having one end connected to said plate and the other end connected to the carrier whereby the carriers are spring-biased to move said wheels into engagement as aforesaid, and a movable link guided on said plate for engaging said carriers to move either or both of said carriers in opposition to the force or forces exerted by said spring or springs.

4. Apparatus according to claim 3 further characterized in that said link comprises a flat plate-like member spaced slightly above said first mentioned plate and slidable in a plane parallel therewith, means to slide said link comprising a lever pivotally mounted on said first mentioned plate and having a hand grip portion extending radially outward of said turntable, the inner end of said lever being trifurcated and said link having a slot projecting inwardly from one of its side edges to receive the middle one of the trifurcations of said lever, the end trifurcations of said lever being bent oppositely out of the plane of said link to slidably engage the top and bottom surfaces of said link adjacent said slot.

5. Apparatus according to claim 3 further characterized in that each of said carriers is mounted on a ferrule projecting upwardly from said plate, said carriers comprising flat plate-like members having elongated apertures to receive the shanks of said ferrules whereby said carriers may have sliding as well as rotational movement with respect to the axes of said ferrules.

6. A driving assembly for a flanged turntable comprising a vertically disposed motor-driven shaft having a driving pulley thereon, a horizontally disposed carrier associated with said pulley and mounted for rotational movement about the axis of said pulley as well as rectilinear movement in a horizontal plane relative thereto, a friction wheel journaled on the outer free end of said carrier, a spring engaging said carrier for biasing the same to such position that said wheel is maintained in driving engagement with said pulley and said flange, a link slidable transversely of the common plane of the axes of said pulley and wheel and positioned on the opposite side of said pulley axis from said wheel axis, a fixed vertically disposed guide stud for said link, a side edge on said link facing away from said axes for sliding on said stud and having a positioning notch therein, said link adapted to have sliding engagement with said carrier to move the same in opposition to said spring and when so moved being operative to transmit force from said spring to said link whereby said edge and notch is maintained in pressure contact with said stud.

7. A driving assembly for a flanged turntable comprising in combination a pair of spaced motor-driven shafts rotatable about axes generally parallel with the axis of rotation of the turntable and each having a driving pulley at its upper end, a mounting plate, a pair of carriers movably mounted on said plate, a friction wheel journaled on each of said carriers and arranged to be brought into yielding engagement with the flange of said turntable and an adjacent one of said pulleys, a spring for each of said carriers having one end connected to said plate and the other end connected to the carrier whereby the carriers are spring-biased to move said wheels into engagement as aforesaid, a movable link guided on said plate for engaging said carriers to move either or both of said carriers in opposition to the force or forces exerted by said spring or springs, a ferrule projecting upwardly from said plate about each of said shafts, said carriers comprising flat plate-like members having elongated apertures to receive the shanks of said ferrules whereby said carriers may have sliding as well as rotational movement with respect to the axes of said ferrules, said link and said carriers being mounted in a common plane, each of said carriers having an integral rounded projection on its outer corner adjacent its mounting ferrule, each of the outer ends of said link having a rounded corner to engage said projections and also having a stepped side edge adjacent said corner whereby upon sliding movement of said link in a general direction toward one of said carriers the said one of said carriers will be rotated and moved rectilinearly to withdraw the friction wheel mounted thereon from both said flange and the adjacent one of said pulleys while upon sliding movement of said link in the opposite direction the other of said carriers will be similarly actuated.

8. A driving assembly for a flanged turntable comprising in combination a pair of spaced motor-driven shafts rotatable about axes generally parallel with the axis of rotation of the turntable and each having a driving pulley at its upper end, a mounting plate, a pair of carriers movably mounted on said plate, a friction wheel journaled on each of said carriers and arranged to be brought into yielding engagement with the flange of said turntable and an adjacent one of said pulleys, a spring for each of said carriers having one end connected to said plate and the other end connected to the carrier whereby the carriers are spring-biased to move said wheels into engagement as aforesaid, a movable link guided on said plate for engaging said carriers to move either or both of said carriers in opposition to the force or forces exerted by said spring or springs, a ferrule projecting upwardly from said plate about each of said shafts, said carriers comprising flat plate-like members having elongated apertures to receive the shanks of said ferrules whereby said carriers may have sliding as well as rotational movement with respect to the axes of said ferrules, the side edges of said link and the end edges of said carriers adjacent said ferrules being so formed that upon the initial engagement of either end of said link with a carrier the carrier engaged is first caused to be rotated and thereafter to be moved rectilinearly in a direction away from the contacting link end.

9. Apparatus according to claim 8 further characterized in that the formed side edges of the end portions of said link are elongated whereby said link may have appreciable over-travel after a previously engaged carrier has been rotated and moved linearly as aforesaid.

WILTON E. BOYD, Jr.

REFERENCES CITED

The following references are of record in the file of this patent:

UNITED STATES PATENTS

| Number | Name | Date |
| --- | --- | --- |
| 1,370,899 | Molesworth | Mar. 8, 1921 |
| 2,097,071 | Lichten | Oct. 26, 1937 |
| 2,325,602 | Gay | Aug. 3, 1943 |
| 2,392,193 | Schneider | Jan. 1, 1946 |
| 2,451,304 | Schneider | Oct. 12, 1948 |